B. D. JONES.
CAR DOOR STRUCTURE.
APPLICATION FILED NOV. 15, 1909.
968,568.
Patented Aug. 30, 1910.
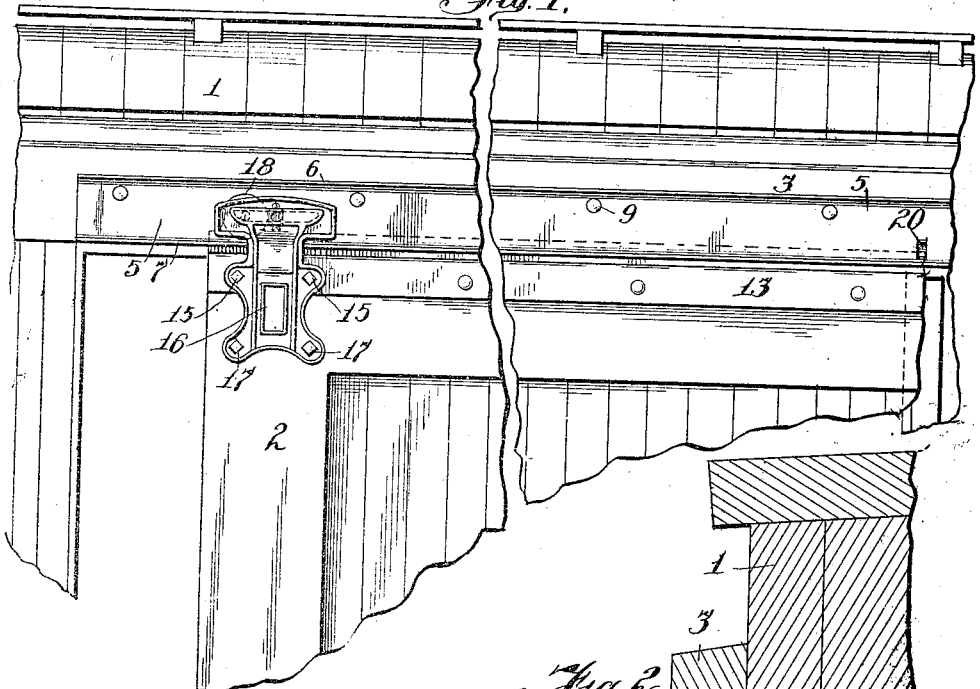
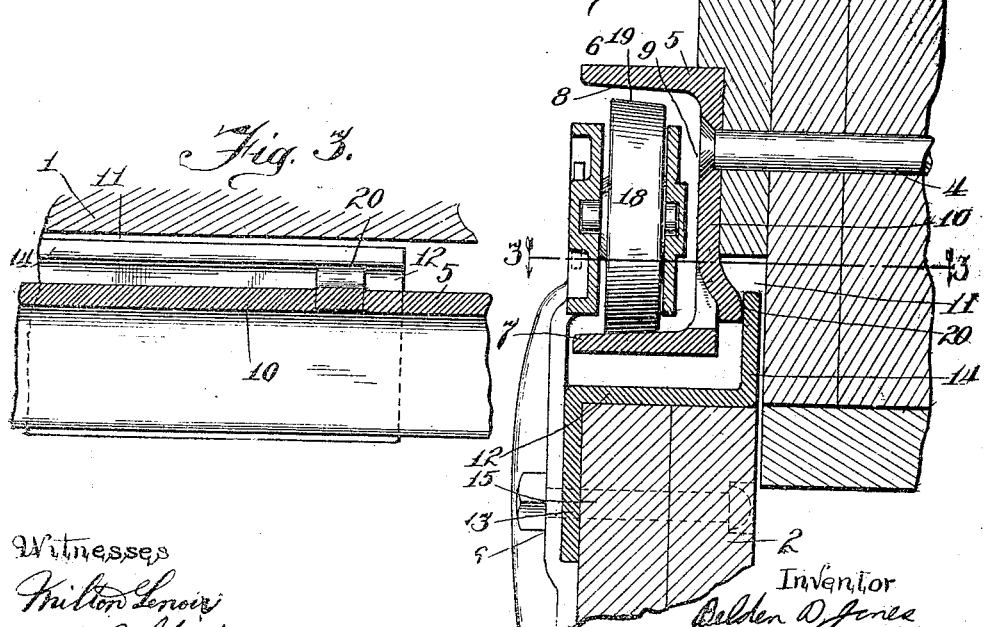
Witnesses
Milton Lenoir
F. L. Belknap
Inventor
Belden D. Jones
by Offield, Towle, Graves & Offield
Attorneys

UNITED STATES PATENT OFFICE.

BELDEN D. JONES, OF CHICAGO, ILLINOIS.

CAR-DOOR STRUCTURE.

968,568.  Specification of Letters Patent.  Patented Aug. 30, 1910.

Application filed November 15, 1909. Serial No. 527,998.

*To all whom it may concern:*

Be it known that I, BELDEN D. JONES, a citizen of the United States, residing in the city of Chicago, county of Cook, and State of Illinois, have invented certain new and useful Improvements in Car-Door Structures, of which the following is a specification.

This invention relates to improvements in car door structures and refers more particularly to improvements in overhead suspension track mechanism of that type in which the track rail which receives the supporting wheels is outwardly facing channel form and preferably consists of a single piece of metal.

Among the salient objects of the invention are to provide, in a construction of the above character, improved means for confining the supporting wheels at all times upon the track, and at the same time prevent binding of the door during its opening and closing movements; to provide a construction in which the upper flange of the channel member serves not only as a hood or weather protection but also as a track-way for the supporting wheels during any uplifting movements of the door structure; to provide a construction in which the upper face of the door is equipped with a longitudinally extending metal Z-bar, which prevents warping of the door and which so coöperates with the channeled track member as to confine the door against lateral displacement without at the same time in any wise interfering with its freedom of movement; to provide a device which is characterized by its simplicity and economy of construction and which can readily be applied to cars of any standard type; and in general to provide an improved construction of the character referred to.

The invention consists in the matters hereinafter described and more particularly pointed out in the appended claims.

In the drawings,—Figure 1 is a fragmentary side elevation of a car body equipped with my invention; Fig. 2 is a similar enlarged vertical sectional view; Fig. 3 is a horizontal sectional view taken on line 3—3 and looking in the direction of the arrows.

The invention relates more particularly to that class of freight car doors which are so supported as to reciprocate in a plane outside of the side walls of the car body and which are, therefore, exposed to rain or detritus from the upper parts of the car body and accordingly require special arrangement of the joints to make the closure suitably weather proof.

Referring to the drawings, 1 designates as a whole the car body and 2 the door, which so far as general features are concerned, may be of any usual or suitable construction. The car body is preferably provided above the door opening with the supporting piece 3 to which is secured by means of a plurality of through bolts 4 the track member designated as a whole 5. This track member is of general channel form, the side flanges 6 and 7 of which are horizontally disposed, so that the track member as a whole faces outwardly. If desired, the inner faces of these flanges may be slightly inclined outwardly, as shown at 8. The heads of the through bolts 4 are countersunk as shown at 9 into the inner or rear face 10 of the track member. As shown more clearly in Fig. 2 the lower end of the track member depends below the supporting piece 3 and forms in connection with the main body of the car a longitudinally extending recess 11 for a purpose hereinafter described.

While the art of door structures of this general character is old, nevertheless difficulty has heretofore been experienced in constructing a door structure which was commercially practical and which at the same time obviated binding and warping of the door incident to exposing the latter for any considerable length of time to wear and weather. As an important feature of the present invention, means are provided for meeting the above conditions in a simple and reliable manner. To this end the upper edge of the door 2 is provided with a Z-bar 12 which extends across the upper edge of the door and is provided with the usual flanges 13 and 14. Near the upper edge of the door are secured by means of suitable through bolts 15 and 17 the supporting brackets 16. If desired the upper bolts 15 may extend through the downwardly extending flange of the Z-bar. The periphery of the walls may be slightly inclined as shown at 19 to conform with the surface of the track ways; the arrangement being such that in the opening and closing movements of the door, the wheels ride outwardly and carry the door free of the car body.

The upper flange 14 of the Z-bar extends within the longitudinally extending recess 11 and is of such height and width as to permit limited lateral and upward movement of this flange within the recess. It will be noted that the distance between the horizontal face of the Z-bar and the lower flange 7 of the track member is greater than the distance between the upper peripheries of the track wheels and the opposed under face of the over-hanging flange 6, from which it follows that in uplifting movements of the door, the wheel will ride upon the upper flange 6 and arrest further upward movement of the door before the latter is brought into contact with any other part of the door structure. To the same end the distance between the upper edge of the flange 14 of the Z-bar and the lower face of the supporting piece 3, is greater than the distance between the peripheries of the wheels and the under face of the overhanging flange 6. This arrangement prevents any binding due to the uplifting movements of the door and also confines the door structure as a whole from lateral displacement.

In order to insure a close fit between the door and car body when the former is closed, I provide an abutment or lug 20 which in the present instance is shown as formed by striking out a portion of the rear face of the channeled track member. This lug or confining member extends into the recess 11 and engages the upstanding flange of the Z-bar. This lug is situated near the central part of the track member, as shown more clearly in Fig. 1. The end of the car door opening opposite the end where said lug is, is provided with the usual channel (not shown) to receive the end of the door when the latter is closed. This is the usual construction and need not be described. The arrangement is such that the door will be securely confined at either end when in closed position, thus forming a weather-proof closure. Accordingly, the drip from the roof of the car will pass out over the Z-bar in place of entering the car body.

The invention is not limited to the details of construction shown except as specified in the appended claims.

I claim as my invention:

1. The combination with a car body provided with a door opening and a door adapted to be moved across said opening, of a channel shaped suspension track member mounted to extend horizontally above said opening with its open side facing outwardly and forming a longitudinally extending recess between its rearmost face and the car body, a Z-bar mounted upon the upper edge of the door and having its upstanding flange projecting into said recess to prevent lateral displacement of the door, supporting brackets connected to the door, track wheels carried by said brackets and riding in said channeled track way, the lower face of said way being inclined downwardly toward its outer edge, said parts being so arranged that the upper peripheries of the track wheels will engage the upper flange of the track member before said Z-bar encounters any other portion of the car body or track member.

2. The combination with a car body provided with a side door opening and a door adapted to be moved across said opening, of a channel shaped suspension track member mounted to extend horizontally above said opening with its open side facing outwardly and forming a longitudinally extending recess between its rear face and the car body, a Z-bar mounted upon the upper edge of the door and having its upstanding flange projecting into said recess to prevent lateral displacement of the door, supporting brackets connected to the door, track wheels carried by said brackets and riding in said channeled track way, said parts being so arranged that the upper peripheries of the track wheels will engage the upper flange of the track member before said Z-bar encounters either the track member or the upper face of said recess.

3. The combination with a car body provided with a door opening and a door adapted to be moved across said opening, of a channel shaped track member mounted to extend horizontally above said opening with its open side facing outwardly and forming a longitudinally extending recess between its rear face and the car body, supporting brackets connected to the door, track wheels carried by said brackets and riding in said channeled track way, and a Z-bar mounted upon the upper edge of the door and having its upstanding flange extending into said recess.

4. The combination with a car body provided with a door opening and door adapted to be moved across said opening, of a channel shaped suspension track member mounted to extend horizontally above said opening with its open side facing outwardly and having a longitudinally extending recess between its rearmost face and the car body, an upstanding flange extending from the inner upper edge of the door and projecting into said recess, supporting brackets connected to the door, track wheels carried by said brackets and riding in said channeled track way, said parts being so arranged that in upward movements of the door the track wheels will engage the upper flange of the track member before the door structure encounters the latter or the car body.

5. The combination with a car body provided with a side door opening and a door adapted to be moved across said opening, of a track member having a pair of spaced apart horizontally extending trackways, said track member being open at its outer end, and forming a longitudinally extending recess between its rear face and the car body, an upstanding flange extending from the inner upper edge of the door and projecting into said recess, supporting brackets connected to the door, track wheels carried by said brackets and riding in said track member, said parts being so arranged that in upward movement of the door the upper peripheries of the track wheels will engage the upper track way before said flange encounters the upper face of said recess or the door encounters the under side of the track member.

BELDEN D. JONES.

Witnesses:
ANNA O'BRIEN.
FRANK L. BELKNAP.